US009063955B2

(12) United States Patent
Wang et al.

(10) Patent No.: US 9,063,955 B2
(45) Date of Patent: Jun. 23, 2015

(54) METHOD AND APPARATUS FOR EDITING PROGRAM SEARCH INFORMATION

(75) Inventors: Bei Wang, Shanghai (CN); Yang Peng, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2094 days.

(21) Appl. No.: 11/721,578

(22) PCT Filed: Dec. 9, 2005

(86) PCT No.: PCT/IB2005/054143
§ 371 (c)(1),
(2), (4) Date: Jul. 24, 2009

(87) PCT Pub. No.: WO2006/067659
PCT Pub. Date: Jun. 29, 2006

(65) Prior Publication Data
US 2009/0279843 A1 Nov. 12, 2009

(30) Foreign Application Priority Data

Dec. 24, 2004 (CN) .......................... 2004 1 0104490

(51) Int. Cl.
*H04N 9/80* (2006.01)
*G06F 17/30* (2006.01)
(Continued)

(52) U.S. Cl.
CPC .......... *G06F 17/3028* (2013.01); *G11B 27/034* (2013.01); *G11B 27/322* (2013.01); *G11B 2220/2562* (2013.01)

(58) Field of Classification Search
None
See application file for complete search history.

(56) References Cited

U.S. PATENT DOCUMENTS 5,546,365 A * 8/1996 Roth .......................... 369/30.09
5,559,608 A * 9/1996 Kunihiro ....................... 386/244
(Continued)

FOREIGN PATENT DOCUMENTS

EP 1061513 A1 12/2000
EP 1280348 A1 1/2003
(Continued)

OTHER PUBLICATIONS

Asakura T, et al; "Real-Time Recognition of Road Traffic Sign in Moving Scene Image Using New Image Filter", SICE 2000, Intnl Session Papers, Proceedings of the 39th SICE Annual Conference, IEEE, pp. 13-18, Jul. 26, 2000, Piscataway, NJ, USA, XP010527080.
(Continued)

*Primary Examiner* — Huy T Nguyen

(57) ABSTRACT

The present invention provides a method and apparatus for editing program search information. The scene descriptive information of optical disc program is edited into a search information unit when the optical disc program is inscribed on an optical disc or optical disc program is off-line edited. Said scene descriptive information includes description of the scene elements. Then said search information unit is edited into a search information file for use in optical disc search. By means of this solution, searching of keyword information, descriptive information of the scene as well as descriptive information of scene element are unified together and directly used as information to be searched, thus the present invention, being different from the conventional search information file such as the playlist which has only the pointer information but not the descriptive information of the object to be searched, simplifies the process of enhanced search.

13 Claims, 2 Drawing Sheets

(51) Int. Cl.
*G11B 27/034* (2006.01)
*G11B 27/32* (2006.01)

(56) References Cited

U.S. PATENT DOCUMENTS

| | | | |
|---|---|---|---|
| 6,360,057 | B1 | 3/2002 | Tsumagari et al. |
| 6,421,499 | B1 * | 7/2002 | Kim et al. ............... 386/241 |
| 7,826,709 | B2 | 11/2010 | Moriya et al. |
| 2003/0138236 | A1 | 7/2003 | Um et al. |
| 2003/0202774 | A1 | 10/2003 | Kim et al. |
| 2003/0225784 | A1 * | 12/2003 | Kim et al. ............ 707/103 R |
| 2004/0143434 | A1 | 7/2004 | Divakaran et al. |
| 2004/0179821 | A1 | 9/2004 | Ando et al. |
| 2004/0240561 | A1 | 12/2004 | Crinon |
| 2006/0026144 | A1 * | 2/2006 | Chun et al. ..................... 707/3 |

FOREIGN PATENT DOCUMENTS

| | | |
|---|---|---|
| JP | 2000250944 A | 9/2000 |
| JP | 2003186885 A | 7/2003 |
| JP | 2005011392 A | 1/2005 |
| JP | 2005018925 A | 1/2005 |
| WO | 02062061 A1 | 8/2002 |
| WO | 03088665 A1 | 10/2003 |
| WO | 2004074976 A2 | 9/2004 |
| WO | 2006038138 A1 | 4/2006 |

OTHER PUBLICATIONS

Ajay Divakaran, Japanese Article in Japanese, 2007-547723, Mitsubishi Electric Research Laboratories, Technology Laboratories, Undated, pp. 5-165-5-168.

* cited by examiner

METHOD AND APPARATUS FOR EDITING PROGRAM SEARCH INFORMATION

FIELD OF THE INVENTION

This invention relates to the field of optical storage, in particular to a method and apparatus for editing program search information.

BACKGROUND OF THE INVENTION

With the development of optical storage techniques, optical discs and the products for playing them have become popularized entertainment products. Personalization and networklization have become two important directions of the present optical storage development, for example, the Java application program introduced into blue-ray optical disc format allows the user to design by himself the operational interface that he likes, and compared with the enhanced type DVD optical disc format that could be linked to the network, blue-ray optical disc format has more powerful functions for network linking.

The realization of optical disc playing function is mostly established on the basis that the optical disc playing device could search the optical disc program. For example, the reason why the user could selectively play different programs and chapters is that under the menu navigation, the descriptive information of different programs and chapters have been edited and managed as optical disc search information, such as being edited into the thumbnail pictures or programs of chapters etc. for searching. Therefore, in order to realize enhanced optical disc playing function, there is a need for enhanced searching for the optical disc program.

The enhanced search allows the user to use a specific actor, location or other elements in the scene as the search keyword to search all the scenes that include said specific actor or specific location. Compared with searching only the chapters or sections previously, the enhanced search has richer searching keywords and is open to much lower searching level, so it could support more powerful playing function, such as the interactive performance of optical disc playing, etc.

In the conventional optical search, the search information is defined in the file system (e.g., menu file) or in the playlist file. The search of optical disc program is realized, only when the optical disc play control file is guided to access the other files that include the descriptive information (such as time, address, etc.) of the corresponding object to be searched through the menu file or the playlist file by searching keyword information (such as program name, chapter, section, etc.) as the pointer.

For the enhanced search, since the searching level is lower and is precise to each scene, the information will be great in amount no matter the keyword information is searched or the descriptive information of each scene is searched. The great amount of information for searching will make the originally complex convention searching process become much more complex, meanwhile, if said information is placed in the file system with the menu file, it will bring some difficulty to the management of the file system.

Therefore, there is the need to provide a method and apparatus for editing program search information so as to realize enhanced search of the optical disc program with a simple process.

OBJECT AND SUMMARY OF THE INVENTION

The technical problem to be solved by the present invention is to provide a method and apparatus for editing program search information so as to overcome the problem existing in the prior art.

According to one embodiment of the present invention, a method of editing program search information is provided, which comprises the following steps: acquiring the descriptive information of a scene of said program, said descriptive information including description to an scene element; generating a scene search information unit according to said descriptive information; and editing a search information file according to said scene search information unit for use in searching of said program.

In the above-mentioned method, the scene search information unit may include the title of said search information unit, the description of the corresponding scene, the description of the element in the corresponding scene, etc., wherein the search information file could be a search information list.

According to an embodiment of the present invention, an apparatus for editing program search information is provided, said apparatus comprises: an acquiring means for acquiring the descriptive information of a scene of said program, said descriptive information including description to a scene element; a generating means for generating a scene search information unit according to said descriptive information; and an editing means for editing a search information file according to said scene search information unit for use in searching of said program.

Other objects and attainments of the invention will become apparent and be appreciated fully by referring to the following description and claims taken in conjunction with the accompanying drawings.

BRIEF DESCRIPTION OF THE DRAWINGS

By means of the embodiments, the present invention is further explained in detail with reference to the figures.

Throughout the above figures, the same references denote the same, similar or corresponding features or functions.

DETAILED DESCRIPTION OF THE INVENTION

The design of the present invention is as follows: in order to realize simple enhanced search, a search information unit is generated according to the scene descriptive information of the optical disc program when the optical disc program is stored on the optical disc or the optical disc program is off-line edited, said search information unit including description of said scene and description of the elements of the scene, then said search information unit is edited into a search information file (e.g., information list file) for use in the enhanced optical disc search. By means of this solution, searching of keyword information and descriptive information of the scene as well as the descriptive information of the scene elements are unified together and are directly used as the information to be searched for searching, thus unlike searching the files by using the conventional menu search and so on, pointer information is not needed any more in the search, accordingly, the process of enhanced search is simplified.

Figure 1:
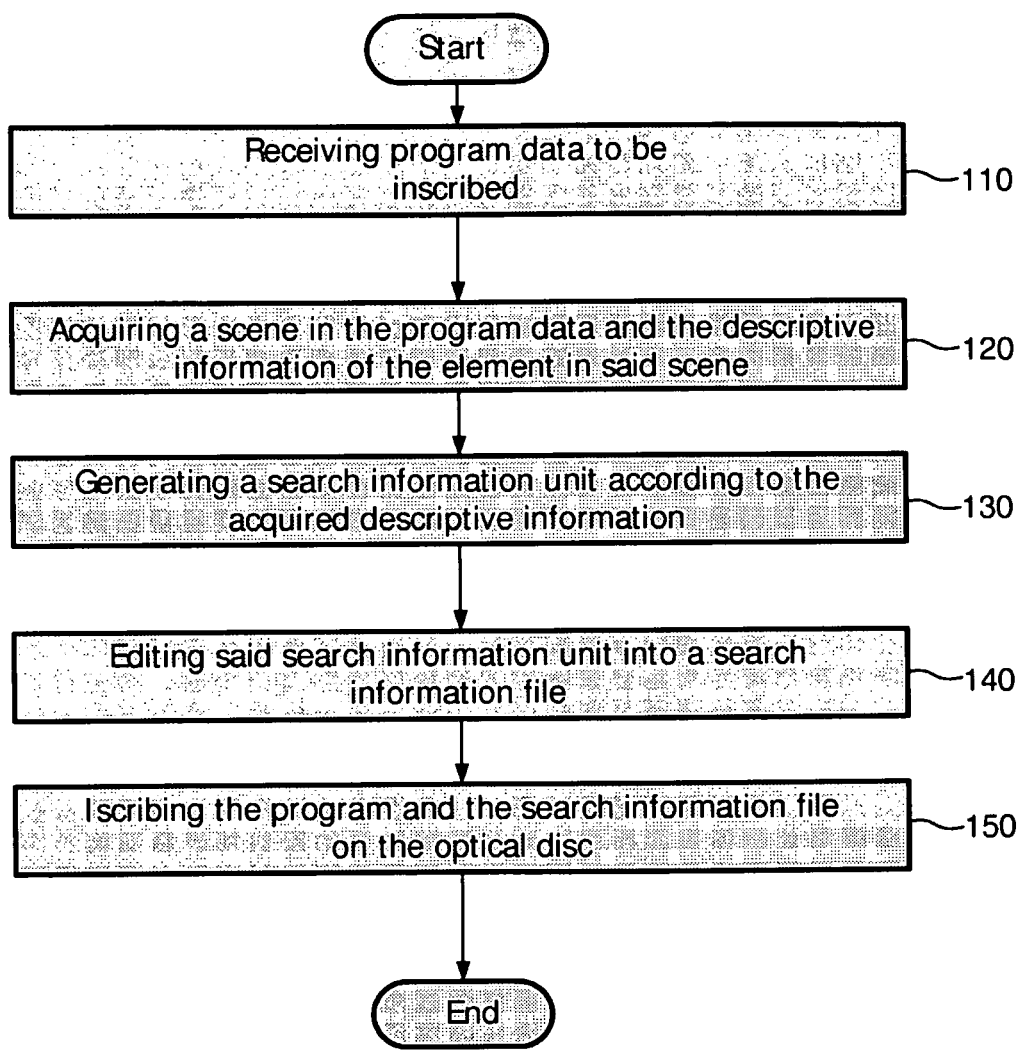
FIG. 1 is a flow chart of the method of editing program search information according to the present invention.

FIG. 1 is a flow chart of the method of editing program search information according to the present invention. This embodiment takes on-line inscribing of optical disc program as an example. When inscribing the optical disc, the optical disc inscribing device first receives the optical disc program to be inscribed from the network or other storage medium (step S110). Of course, the program to be inscribed could also have be already stored in the storage unit of the optical disc inscribing device.

Then, a scene in the optical disc program data and the descriptive information of the scene elements therein is acquired (step S120). An optical disc program includes a plurality of scenes. Accordingly, the optical disc program data includes a plurality of scene data, each including both the data with respect to the whole scene and the data with respect to each element of the scene. On the basis of said data, the descriptive information of the whole scene and of each scene element of the scene could be acquired, for instance, the time descriptive information, address descriptive information, name information of specific scene or specific element, information associated with other scenes or scene elements, state information of the scene element, information of type and number of the scene element, etc. Said pieces of descriptive information could enable the optical disc playing device to search the scene and scene element through various search keywords during the future optical disc playing.

Subsequently, a search information unit is generated according to the acquired descriptive information (step S130). The generated search information unit comprises the name of the search information unit, the name of the corresponding scene, the descriptive information of the corresponding scene (such as the time, address, etc.), descriptive information of the element of the corresponding scene (such as the name, costume of the actor and the spot description of the scene, etc.).

Next, the generated search information unit is edited into a search information file (e.g., information list) (step S140). The search information file could be either a separate search information list file which includes various search information units for searching or a part or segment for searching included in a playlist file for searching.

Finally, the program and search information file are stored on the optical disc (step S150). Such method for creating search information file could be applied to the process of editing and publishing optical discs or be applied to rewritable disc. While as far as the rewritable disc is concerned, the optical disc program is off-line edited after the optical disc program has been stored on the optical disc.

According to the above-mentioned method, the descriptive information corresponding to a scene and the elements of the scene is included in a corresponding search data unit and is edited into a search information file of said optical disc for enhanced search. When playing the optical disc, the user could use a specific scene element (such as the name of the actor, etc.) as the search keyword information to search the information file directly through the optical disc, thus enhanced search of the optical disc program is realized.

Figure 2:
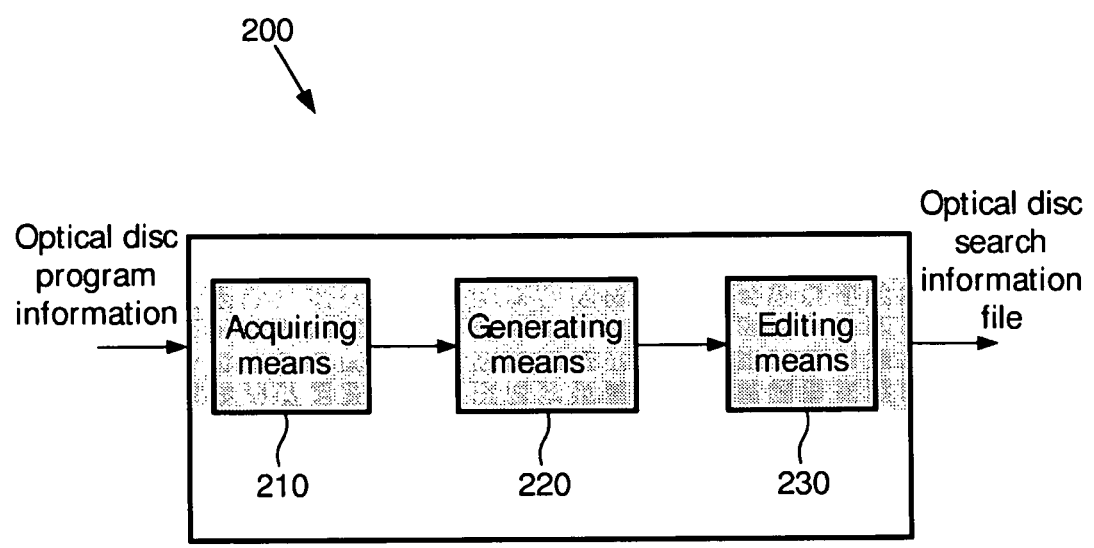
FIG. 2 is a block diagram of the apparatus for editing program search information according to the present invention.

FIG. 2 is a block diagram of the apparatus 200 for editing program search information according to the present invention. Apparatus 200 comprises an acquiring means 210 for acquiring the descriptive information of a scene of a program, which includes the description of the scene element. For example, a scene is the scene sequential number of said program or chapter, the name of the scene elements (people, location, etc.) and the description information of the state of each scene element, etc., are included in said scene.

Apparatus 200 further comprises a generating means 220 for generating a scene search information unit according to said descriptive information, which includes information using said scene element as the search keyword. A search information unit is generated corresponding to a scene, said information unit including the name of the search information unit, the name of the corresponding scene, the descriptive information of the corresponding scene (such as time, address, data amount, etc.), and the descriptive information of the element of the corresponding scene (such as the name and costume of the actor and description of the scene location, etc.).

Apparatus 200 further comprise an editing means 230 for editing a search information file according to said scene search information unit for use in the search of said optical disc program. The search information units corresponding to each of the scenes are edited together to form a search information file, or the scene search information unit could be added into an available search information file, that is, the search information file could be open and updateable. Said search information list file could include a plurality of scene search units.

Apparatus 200 could be included in an optical disc inscribing device. The optical disc inscribing device, that includes apparatus 200, could also include an optical disc program receiving device for receiving optical disc program to be inscribed on the optical disc.

The present invention is illustrated in the following by taking the example of enabling an enhanced search of the optical disc program of the rewritable Blue-ray optical disc.

Table 1 is an optical disc playlist file that includes the search information of Blue-ray optical disc according to the present invention. The portion indicated in the brace outside of table 1 in the right is the content of the optical disc search information list according to the present invention, and in the present embodiment, it is listed as being included in a segment of the list of optical disc playlistmark in the optical disc playlist file, of course, it could also be an independent file.

As shown in table 1, in the list of optical disc playlistmark, a new mark type for searching information is defined according to the present invention, and said mark type is defined as enhanced search mark as in the present embodiment. In marks of such type, the mark name, the descriptive information in the mark (mark metadata), and time information are included, of course, it could also include the pointer information of some thumbnail pictures and the information of the maker, wherein the descriptive information in the mark includes the descriptive information of the corresponding specific scene, the descriptive information of the element in said scene, etc.

Generally speaking, a search mark, as a scene search information unit, corresponds to a scene so the file of the list of the playlistmark could include search marks corresponding to many scenes, while each search mark includes both the descriptive information of the scene and the descriptive information of many elements in said scene; meanwhile, said file of the list of the playlistmark is extendable, i.e., descriptive information of the scene and the elements of the scene could be added thereto according to the need of the editor or user, or description of the newly selected scene could also be added, etc.

TABLE 1 an optical disc playlist file that includes the
search information of Blue-ray optical disc

| Gramma | Byte number | Data type |
|---|---|---|
| PlayListMark( ) { | | |
|    Length | 32 | Uimsbf |
|    number_of_PlayList_marks | 16 | Uimsbf |
|    for(i=0; i<number_of_PlayList_marks; I++) { | | |
|       Mark_invalid_flag | 1 | Uimsbf |
|       Mark_type | 7 | Uimsbf |

TABLE 1-continued an optical disc playlist file that includes the
search information of Blue-ray optical disc

| Gramma | Byte number | Data type |
|---|---|---|
|     Mark_name_length | 8 | Uimsbf |
|     Maker_ID | 16 | Uimsbf |
|     ref_to_PlayItem_id | 16 | Uimsbf |
|     Mark_time_stamp | 32 | Uimsbf |
|     Entry_ES_PID | 16 | Uimsbf |
|     If(mark_type=0x01 \|\| mark_type==0x02) { | | |
|         ref_to_menu_thumbnail_index | 16 | Uimsbf |
|     } else { | | |
|         ref_to_mark_thumbnail_index | 16 | Uimsbf |
|     } | | |
|     Duration | 32 | Uimsbf |
|     makers_information | 32 | Bslbf |
|     mark_name | 8*24 | Bslbf |
|     mark_metadata* | tbd* | tbd* |
| } | | |
| } | | |

In conventional techniques, there are usually only six mark types in table 1, they are representative picture mark and the picture is selected from picture in the playlist, representative picture mark and the picture is not selected from picture in the playlist, resume mark, book-mark, chapter mark, and skip-start-mark. The above-mentioned six marks could also be used as conventional search information, but said six types of information could only support conventional search in the play control; on the other hand, simple search made by the above six types of mark information could only be realized by other files that include the descriptive information of the object to be searched.

The search mark information defined in the present invention not only includes descriptive information precise to the scene elements, but these pieces of descriptive information are directly edited into the search mark. By means of the search mark, the simple enhanced optical disc search could be directly realized. According to the present invention, the search mark information corresponding to the scene could also be separately edited into an optical disc search mark information file instead of being listed in the above-mentioned optical disc playlist file.

Table 2 is a schematic table of the optical disc search information file. In an optical disc program, the editor selects scene 1, scene 2, scene 3, etc. as the scenes for enhanced search. Each scene includes various scene elements, such as the name of the actor, the location, the costume of the actor, etc. By determining a search information unit for a scene (as shown in a row of descriptions of the scene elements corresponding to a scene in Table 2), and by using a scene element as a search keyword, search of said scene could be realized. For instance, the name of actor A is used as the search keyword, then scene 1 and scene 3 could be directly found, while when the location Guangzhong is used as the search keyword, scene 3 and scene 4 could be found.

TABLE 2 a schematic table of the optical disc search information file

| | Scene Elements | | | |
|---|---|---|---|---|
| Scene | Name of actors | Locations | Costume | ... |
| Scene 1 | Actor A | Shanghai | Chinese costume | ... |
| Scene 2 | Actor B | Beijing | Western costume | ... |
| Scene 3 | Actor A and B | Guangzhou | Chinese costume | ... |
| Scene 4 | Actor C | Guangzhou | Ancient costume | ... |
| ... | ... | ... | ... | ... |

Corresponding to the enhanced search of optical disc program, the corresponding enhanced search interface has to be provided to the user. According to the conventional method, the corresponding user search interface could be designed, but the search keyword information of enhanced search is much richer as to being detailed to the elements in the scene, in this way, the function of searching the scene according to the elements in the scene is provided.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

The invention claimed is:

1. A method of editing program search information, comprising the steps of:
    acquiring descriptive information of a scene of a program, said descriptive information including a description of said scene as a whole and a description of elements within said scene;
    generating a scene search information unit according to said descriptive information, and;
    editing a search information file according to said scene search information unit for use in searching of said program, wherein said edited search information file is enhanced with information regarding said description of elements within said scene by including search marks precise to said elements wherein one element is associated with a plurality of scenes.

2. The method as claimed in claim 1, wherein descriptive information of said scene includes at least one of: an address information of said scene and a time information of said scene.

3. The method as claimed in claim 1, wherein said scene search information unit includes at least one of: a type of the information unit, the descriptive information of the scene, and the descriptive information of the element of the scene.

4. The method as claimed in claim 3, wherein said descriptive information of the elements of the scene includes at least one of: a name of the scene element, a number of the scene element, a kind of the scene element, and a state of the scene element.

5. An apparatus for editing program search information, comprising:
    an acquiring means for acquiring descriptive information of a scene of a program, said descriptive information including a description of said scene as a whole and a description of elements within said scene;
    a generating means for generating a scene search information unit according to said descriptive information; and
    an editing means for editing a search information file according to said scene search information unit for use in searching of said program, wherein said edited search information file is enhanced with said description of elements within said scene by including search marks precise to said elements, wherein one element is associated with a plurality of scenes.

6. The apparatus as claimed in claim 5, wherein the descriptive information of said scene includes at least one of: a address information of said scene and a time information of said scene.

7. The apparatus as claimed in claim 5, wherein said scene search information unit includes at least one of: a type of the information unit, the descriptive information of the scene, and the descriptive information of the elements of the scene.

8. The apparatus as claimed in claim 7, wherein said descriptive information of the elements of the scene includes at least one of: a name of the scene element, a number of the scene element, a kind of the scene element, and a state of the scene element.

9. An optical inscribing device, comprising:
a device for editing program search information, comprising:
an acquiring means for acquiring descriptive information of a scene of a program, said descriptive information including a description of said scene as a whole and a description of elements within said scene;
a generating means for generating a scene search information unit according to said descriptive information; and
an editing means for editing a search information file according to said scene search information unit for use in searching of said program, wherein said edited search information file is enhanced with a description of elements within said scene by including search marks precise to said elements, wherein one element is associated with a plurality of scenes; and
an inscribing device for inscribing an optical disc with said program and said enhanced search information file.

10. The device as claimed in claim 9, wherein said scene search information includes at least one of: an address information of said scene and a time information of said scene.

11. The device as claimed in claim 9, wherein said scene search information unit includes at least one of: a type of the information unit, the descriptive information of the scene, and the descriptive information of the elements of the scene.

12. The device as claimed in claim 11, wherein said descriptive information of the elements of the scene includes at least one: a name of the scene element, a number of the scene element, a kind of the scene element, and a state of the scene element.

13. The device as claimed in claim 11, further comprising a receiving means for receiving said program.

* * * * *